July 24, 1923. 1,462,612

A. H. MONES

COVER PLATE FOR STORAGE BATTERIES

Filed April 11, 1921

INVENTOR
ARTHUR H. MONES.

BY
ATTYS.

Patented July 24, 1923.

1,462,612

UNITED STATES PATENT OFFICE.

ARTHUR HERBERT MONES, OF KERROBERT, SASKATCHEWAN, CANADA.

COVER PLATE FOR STORAGE BATTERIES.

Application filed April 11, 1921. Serial No. 460,172.

*To all whom it may concern:*

Be it known that I, ARTHUR HERBERT MONES, a subject of the King of Great Britain, and resident of the town of Kerrobert, in the Province of Saskatchewan, Dominion of Canada, have invented certain new and useful Improvements in Cover Plates for Storage Batteries, of which the following is a specification.

This invention relates to improvements in cover plates for storage batteries, and the objects of the invention are to provide a simple and effective form of cover plate which may be readily attached or detached to permit inspection or repair of the interior of the battery.

Further objects are to provide such a plate as may be sealed in position without the use of any sealing compound, such as at present employed, and which must be used each time the battery is opened.

Further objects are to provide a simple form of connecting the poles of the battery, which may be readily attached and detached thereto, and to provide a simple form of clamp for retaining the cover plate in position.

Further objects still are generally to improve and simplify the construction of the cover plate to better adapt the various parts to perform the functions required of them.

And it consists essentially of the improved construction hereinafter described in detail in the accompanying specification and drawings.

In the drawings.

In the drawings like characters of reference indicate corresponding parts in all the figures.

Figures 1, 2:
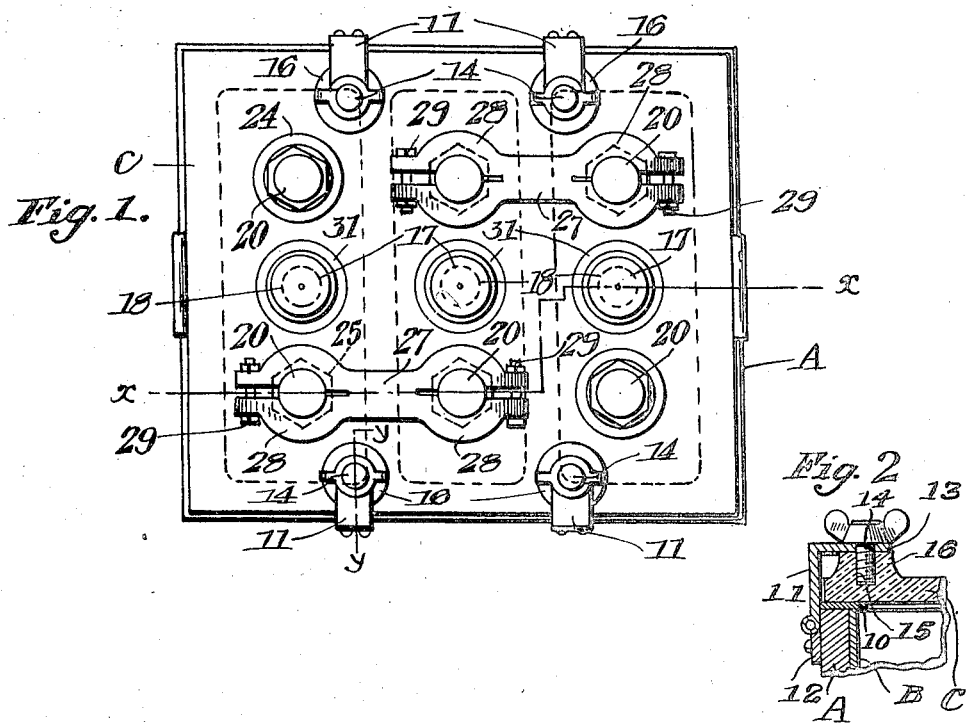
Figure 1 is a plan view of an embodiment of the invention.
Figure 2 is a sectional detail on the line $y$—$y$, Figure 1.

Referring to the drawings:

A indicates the battery box and B, the battery jars of which a plurality are contained in the box and which may be of any construction well-known in the art. C indicates my improved cover plate, constructed of insulating material, acid and water proof. I have found plastic material, such as glass or hard rubber, most suitable for this purpose. This plate is moulded in a single piece, shaped to fit the top of the battery box. The joint between the battery box and the cover plate may be sealed by means of a suitable gasket 10 of rubber, or like material, extending between the cover plate and the battery and over the edges of the battery jars.

The cover plate is retained in position by suitable clamping means, formed of such means which I have illustrated, comprising a plurality of pivoted clamps 11, L-shaped in form and pivoted at one end to brackets 12 on the side of the battery box and having perforations 13 in their free end through which clamping bolts 14 extend into threaded sockets 15 provided in projections 16 formed integral with the cover plate C. It will be seen that, by releasing the bolts 14, which are conveniently provided with wing nuts the cover plate may be easily and quickly released.

The cover plate is formed above each battery jar with holes 17 normally closed by vent or inspection plugs 18, which may have screw-threaded engagement with the sides of the holes 17.

20 indicates the terminals of the battery plates 21, which are suitably designed and located within the battery jars B.

27 indicates connecting links adapted to connect the positive and negative poles of adjacent batteries, these being adapted to fit on the projecting poles 20 above the nuts 25. The links are conveniently formed of spring metal having bifurcated ends 28 adapted to surround the pole pieces and to be clamped against the same by bolts 29, which extend through the extremities of the pole ends.

From the foregoing, it will be seen that the invention provides a simple and effective form of plate which may be readily attached and detached and yet which will be effectually sealed in position on the battery box.

As many changes could be made in the above construction, and many apparently widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

In a battery, the combination with a battery box and cover plate having raised bosses adjacent to the edges therein formed with threaded sockets, of clamps pivoted to the battery box extending over and in close contact with the bosses, and threaded bolts extending through the clamps into the threaded sockets in the bosses.

In witness whereof I have hereunto set my hand in the presence of a witness.

ARTHUR HERBERT MONES.

Witness:
   RUSSEL S. SMART.